United States Patent
Qiu

(10) Patent No.: US 12,410,007 B2
(45) Date of Patent: Sep. 9, 2025

(54) PEDAL BIN

(71) Applicant: JIANGSU ZHONGHENG PET ARTICLES JOINT-STOCK CO., LTD., Jiangsu (CN)

(72) Inventor: Bin Qiu, Jiangsu (CN)

(73) Assignee: JIANGSU ZHONGHENG PET ARTICLES JOINT-STOCK CO., LTD., Jiangsu (CN)

( * ) Notice: Subject to any disclaimer, the term of this patent is extended or adjusted under 35 U.S.C. 154(b) by 0 days.

(21) Appl. No.: 18/642,757

(22) Filed: Apr. 22, 2024

(65) Prior Publication Data

US 2025/0214768 A1 Jul. 3, 2025

(30) Foreign Application Priority Data

Dec. 29, 2023 (CN) .......................... 202311853397.4

(51) Int. Cl.
B65F 1/16 (2006.01)

(52) U.S. Cl.
CPC ........ B65F 1/163 (2013.01); *B65F 2210/167* (2013.01)

(58) Field of Classification Search
CPC ................ B65F 1/163; B65F 2210/167; B65F 2001/1676; B65F 2001/1653; B65D 43/262; A47G 29/1251; A47G 29/1248
See application file for complete search history.

(56) References Cited

U.S. PATENT DOCUMENTS

| | | | |
|---|---|---|---|
| 8,136,688 B2 * | 3/2012 | Lee .......................... | B65F 1/163 220/264 |
| 8,333,293 B2 * | 12/2012 | Morand ................ | B65F 1/1607 220/264 |
| 9,309,048 B2 * | 4/2016 | Mashburn ................. | B65F 1/06 |
| 11,078,015 B2 * | 8/2021 | Mashburn ............... | B65F 1/062 |
| 11,858,734 B1 * | 1/2024 | Wang ........................ | B65F 1/06 |
| 2005/0106706 A1 * | 5/2005 | Chomik .................. | A61N 1/325 220/252 |
| 2006/0186121 A1 * | 8/2006 | Yang ....................... | B65F 1/163 220/263 |
| 2007/0012699 A1 * | 1/2007 | Yang ....................... | B65F 1/163 220/264 |

(Continued)

FOREIGN PATENT DOCUMENTS

DE 19901680 B4 * 2/2004 ............ B65F 1/1415

*Primary Examiner* — William L Miller

(74) *Attorney, Agent, or Firm* — JCIPRNET

(57) ABSTRACT

A pedal bin includes a base, a bin body, a garbage bag compartment, a lid, a pedal, a first connecting rod, a toggle block, a first restoring member, a first limiting portion, a linkage mechanism, and a baffle plate. The bin body is detachably connected to the base and the garbage bag compartment. The lid is hingedly connected to the garbage bag compartment. The pedal is rotatably arranged at the base. The first connecting rod is hingedly connected to the pedal, and connected to the lid. The toggle block is rotatably arranged on the first connecting rod. The linkage mechanism is arranged in the garbage bag compartment and forms a clutch structure with the toggle block. The first limiting portion is arranged on the first connecting rod and is pressed against the toggle block. The first restoring member is connected to the toggle block and the first connecting rod.

8 Claims, 6 Drawing Sheets

(56) References Cited

U.S. PATENT DOCUMENTS

| | | | |
|---|---|---|---|
| 2009/0126320 A1* | 5/2009 | Rousso | B29C 66/83221 |
| | | | 206/303 |
| 2009/0127260 A1* | 5/2009 | Rousso | B65F 1/163 |
| | | | 220/495.01 |
| 2010/0084235 A1* | 4/2010 | Lu | B65F 1/163 |
| | | | 188/280 |
| 2010/0294769 A1* | 11/2010 | Lee | B65F 1/163 |
| | | | 220/263 |
| 2013/0105486 A1* | 5/2013 | Mashburn | B65F 1/163 |
| | | | 220/264 |
| 2014/0238989 A1* | 8/2014 | Wang | B65F 1/163 |
| | | | 220/264 |
| 2015/0076153 A1* | 3/2015 | Rousso | B65B 67/1211 |
| | | | 220/495.08 |
| 2019/0009982 A1* | 1/2019 | Lu | B65D 43/24 |
| 2019/0152696 A1* | 5/2019 | Wegner | B65F 1/0053 |
| 2020/0260896 A1* | 8/2020 | Leng | A47G 29/1251 |
| 2021/0354912 A1* | 11/2021 | Morand | B65F 1/1646 |
| 2022/0250834 A1* | 8/2022 | Gilsrud | B65F 1/163 |
| 2024/0400300 A1* | 12/2024 | Meier | B65F 1/06 |
| 2025/0128878 A1* | 4/2025 | Belluomini | B65F 1/068 |

\* cited by examiner

PEDAL BIN

CROSS-REFERENCE TO RELATED APPLICATION

This application claims the priority benefit of China application serial no. 202311853397.4, filed on Dec. 29, 2023. The entirety of the above-mentioned patent application is hereby incorporated by reference herein and made a part of this specification.

BACKGROUND

Technical Field

The present disclosure belongs to the technical field of waste containers, and specifically relates to a pedal bin.

Description of Related Art

A waste container is a commonly used article for daily use. A pedal bin is a container with a lid operated by a foot pedal, and is very convenient to use. However, the lid must be opened in order for the user to throw waste into the bin, and unpleasant smell will disperse from the bin, making the user feel uncomfortable.

SUMMARY

An objective of the present disclosure is to provide a pedal bin to solve the above problems of the prior art.

The following technical solutions are adopted. A pedal bin is provided, which includes a base, a bin body, a garbage bag compartment, a lid, a pedal, a first connecting rod, a toggle block, a first restoring member, a first limiting portion, a linkage mechanism, and a baffle plate, where the bin body is detachably connected to a top of the base, the garbage bag compartment is detachably connected to an opening at a top of the bin body, and the lid is hingedly connected to a top of the garbage bag compartment;

the pedal is rotatably arranged at a bottom of the base, a first end of the first connecting rod is hingedly connected to the pedal, and a second end of the first connecting rod is connected to the lid;

the toggle block is rotatably arranged on a side surface of the first connecting rod, and the linkage mechanism is arranged in an inner cavity of the garbage bag compartment and forms a clutch structure with the toggle block to control opening and closing of the baffle plate;

the first limiting portion is arranged on the side surface of the first connecting rod and is pressed against a top of the toggle block; and the first restoring member is connected to the toggle block and the first connecting rod, the pedal is configured to drive the first connecting rod to move upward to cause the toggle block to contact the linkage mechanism and rotate, and after the toggle block is moved upward and separated from the linkage mechanism, the toggle block is reset by the first restoring member.

Preferably, the linkage mechanism includes a positioning shell, toggle rods, a second restoring member, a second connecting rod, a transmission rod, and a second limiting portion;

the positioning shell is detachably connected to the inner cavity of the garbage bag compartment, a slide rail is arranged on a side surface of the positioning shell, and an end of the baffle plate is slidably arranged in the slide rail;

a first end of the second connecting rod is hingedly connected to the baffle plate, a second end of the second connecting rod is hingedly connected to one of the toggle rods, the toggle rods are rotatably arranged on a side wall of the positioning shell, and a stop block is arranged at a top of each of the toggle rods;

the second limiting portion is arranged on the side wall of the positioning shell and is pressed against a side surface of the stop block;

a first end of the transmission rod is connected to one of the toggle rods, and a second end of the transmission rod is connected to another of the toggle rods; and the second restoring member is connected to one of the toggle rods and the positioning shell, the first connecting rod is moved downward to cause the toggle block to press downward the stop block to drive the toggle rods to rotate, and when the toggle block is moved downward and separated from the stop block, the toggle rods are reset by the second restoring member.

Preferably, a slide groove is provided at a top of the first connecting rod, a connection portion is arranged on a bottom surface of the lid, and a side surface of the connection portion is slidably arranged in the slide groove.

Preferably, a third restoring member is arranged on the side surface of the first connecting rod, and a bottom of the third restoring member is connected to the base.

Preferably, a blind hole is provided on a top surface of the pedal, an elastic member is arranged in the blind hole, and a top of the elastic member is pressed against the bottom of the base.

Preferably, a door panel and an access port are provided on the bin body, the door panel is configured to cover an opening of the access port, and a cutter is arranged on a wall of the access port.

Preferably, a suction cup is detachably connected to the bottom of the base.

Preferably, the pedal bin further includes a clamping ring, where the clamping ring is detachably connected to the top of the garbage bag compartment, and the lid is configured to cover an opening of the clamping ring.

In conclusion, the present disclosure has the following advantages.

1. When a user steps on the pedal, the first connecting rod is moved upward to cause the toggle blocks to contact the linkage mechanism and rotate. After the toggle blocks are moved upward and separated from the linkage mechanism, the toggle blocks are reset by the first restoring member respectively. The lid is pushed open by the first connecting rod. When the lid is opened, the baffle plates are in a closed state to seal an upper portion of a garbage bag, and waste thrown by the user falls on the baffle plates. In this way, unpleasant smell will not disperse from the garbage bag, thereby preventing the user's discomfort caused by unpleasant smell. When the user releases the pedal, the first connecting rod is moved downward to cause the toggle blocks to contact the linkage mechanism. Under the action of the first limiting portions, the toggle blocks do not rotate, so that the linkage mechanism controls the baffle plates to open to allow the waste to fall into a bottom of the garbage bag. After the toggle blocks are moved downward and separated from the linkage mechanism, the linkage mechanism controls the baffle plates to close to seal the upper portion of the garbage bag again.

2. The user may open the door panel, tie up the upper portion of the garbage bag, cut off the garbage bag with the cutter, and replace the garbage bag. Therefore, the garbage bag can be conveniently replaced.

Figure 1:
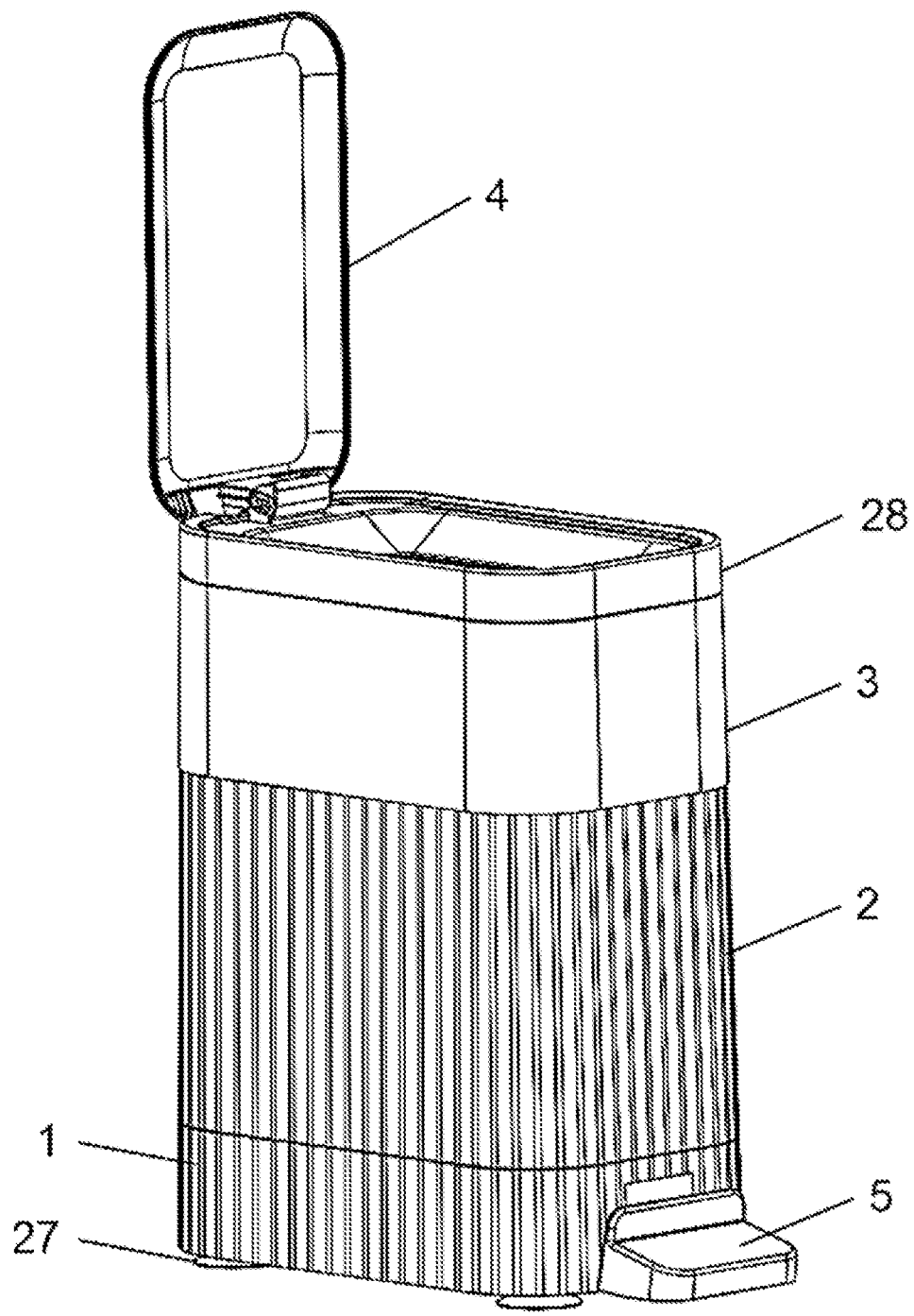
FIG. 1 is a schematic structural diagram of a pedal bin according to the present disclosure.

List of reference numerals: 1. base; 2. bin body; 3. garbage bag compartment; 4. lid; 5. pedal; 6. first connecting rod; 7. toggle block; 8. first restoring member; 9. first limiting portion; 10. baffle plate; 11. positioning shell; 12. toggle rod; 13. second restoring member; 14. second connecting rod; 15. transmission rod; 16. slide rail; 17. stop block; 18. second limiting portion; 19. slide groove; 20. connection portion; 21. third restoring member; 22. blind hole; 23. elastic member; 24. door panel; 25. access port; 26. cutter; 27. suction cup; 28. clamping ring.

DESCRIPTION OF THE EMBODIMENTS

In the following description, numerous specific details are given to provide a more thorough understanding of the present disclosure. However, it will be apparent to those skilled in the art that the present disclosure can be practiced without one or more of these details. In some other examples, to avoid confusion with the present disclosure, some technical features well known in the art are not described.

Embodiment 1

As shown in FIG. 1 to FIG. 6, a pedal bin disclosed in this embodiment includes a base 1, a bin body 2, a garbage bag compartment 3, a lid 4, a pedal 5, a first connecting rod 6, two toggle blocks 7, two first restoring members 8, two first limiting portions 9, a linkage mechanism, and two baffle plates 10. The bin body 2 is detachably connected to a top of the base 1. The garbage bag compartment 3 is detachably connected to an opening at a top of the bin body 2. The lid 4 is hingedly connected to a top of the garbage bag compartment 3. The pedal 5 is rotatably arranged at a bottom of the base 1. A first end of the first connecting rod 6 is hingedly connected to the pedal 5, and a second end of the first connecting rod 6 is connected to the lid 4. Each of the toggle blocks 7 is rotatably arranged on a side surface of the first connecting rod 6. The linkage mechanism is arranged in an inner cavity of the garbage bag compartment 3 and forms a clutch structure with each of the toggle blocks 7 to control opening and closing of one of the baffle plates 10. Each of the first limiting portions 9 is arranged on the side surface of the first connecting rod 6 and is pressed against a top of one of the toggle blocks 7. Each of the first restoring members 8 is connected to one of the toggle blocks 7 and the first connecting rod 6. The pedal 5 is configured to drive the first connecting rod 6 to move upward to cause the toggle blocks 7 to contact the linkage mechanism and rotate. After the toggle blocks 7 are moved upward and separated from the linkage mechanism, the toggle blocks 7 are reset by the first restoring members 8 respectively. When a user steps on the pedal 5, the first connecting rod 6 is moved upward to cause the toggle blocks 7 to contact the linkage mechanism and rotate. After the toggle blocks 7 are moved upward and separated from the linkage mechanism, the toggle blocks 7 are reset by the first restoring member 8 respectively. The lid 4 is pushed open by the first connecting rod 6. When the lid 4 is opened, the baffle plates 10 are in a closed state to seal an upper portion of a garbage bag, and waste thrown by the user falls on the baffle plates 10. In this way, unpleasant smell will not disperse from the garbage bag, thereby preventing the user's discomfort caused by unpleasant smell. When the user releases the pedal 5, the first connecting rod 6 is moved downward to cause the toggle blocks 7 to contact the linkage mechanism. Under the action of the first limiting portions 9, the toggle blocks 7 do not rotate, so that the linkage mechanism controls the baffle plates 10 to open to allow the waste to fall into a bottom of the garbage bag. After the toggle blocks 7 are moved downward and separated from the linkage mechanism, the linkage mechanism controls the baffle plates 10 to close to seal the upper portion of the garbage bag again.

For example, the first restoring members 8 may each be a torsion spring. After the toggle blocks 7 are moved upward and separated from the linkage mechanism, the toggle blocks 7 are reset by torsion forces of the torsion springs respectively.

Figure 3:
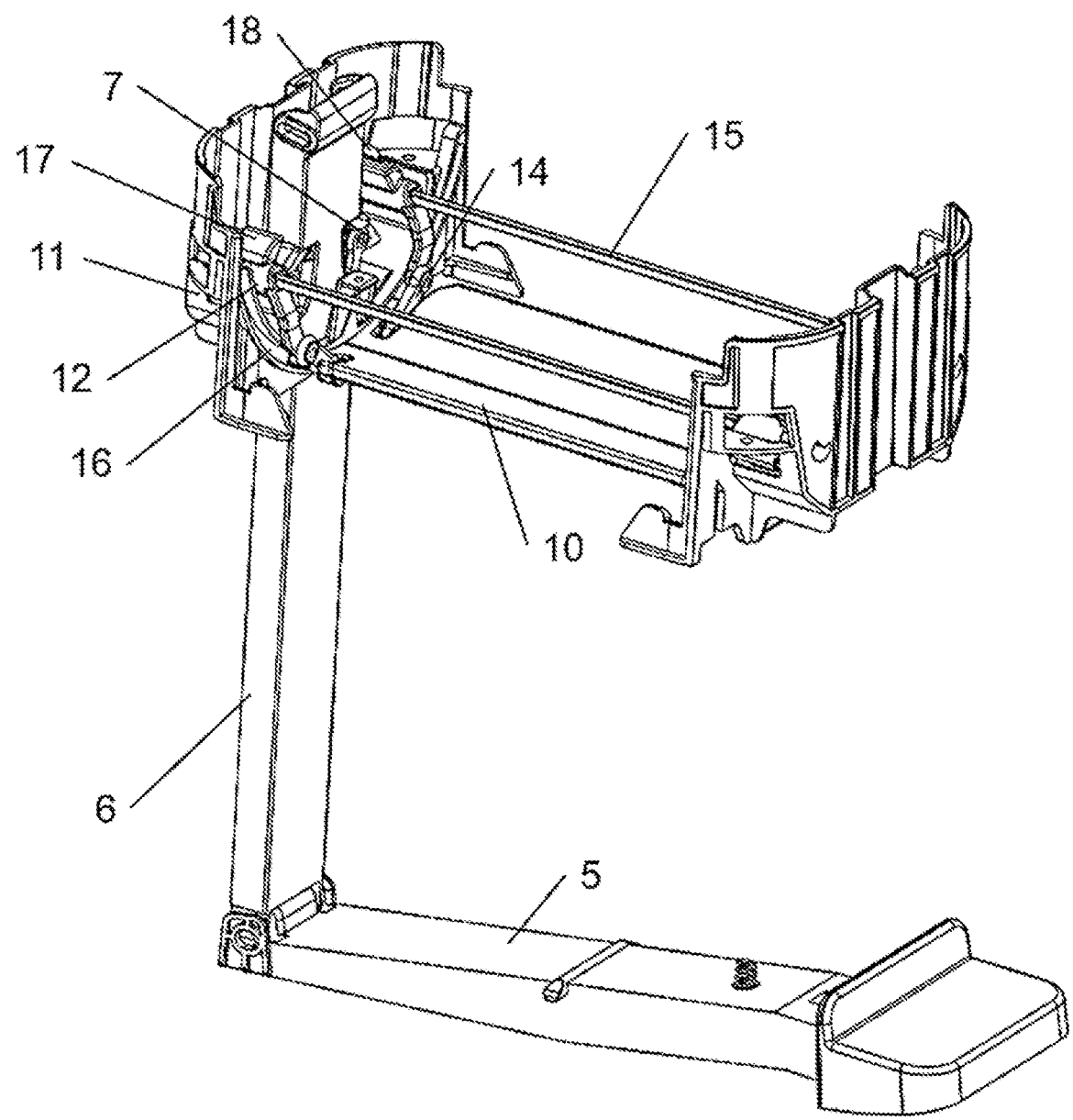
FIG. 3 is a partial schematic structural diagram of a pedal bin according to the present disclosure.
Figure 5:
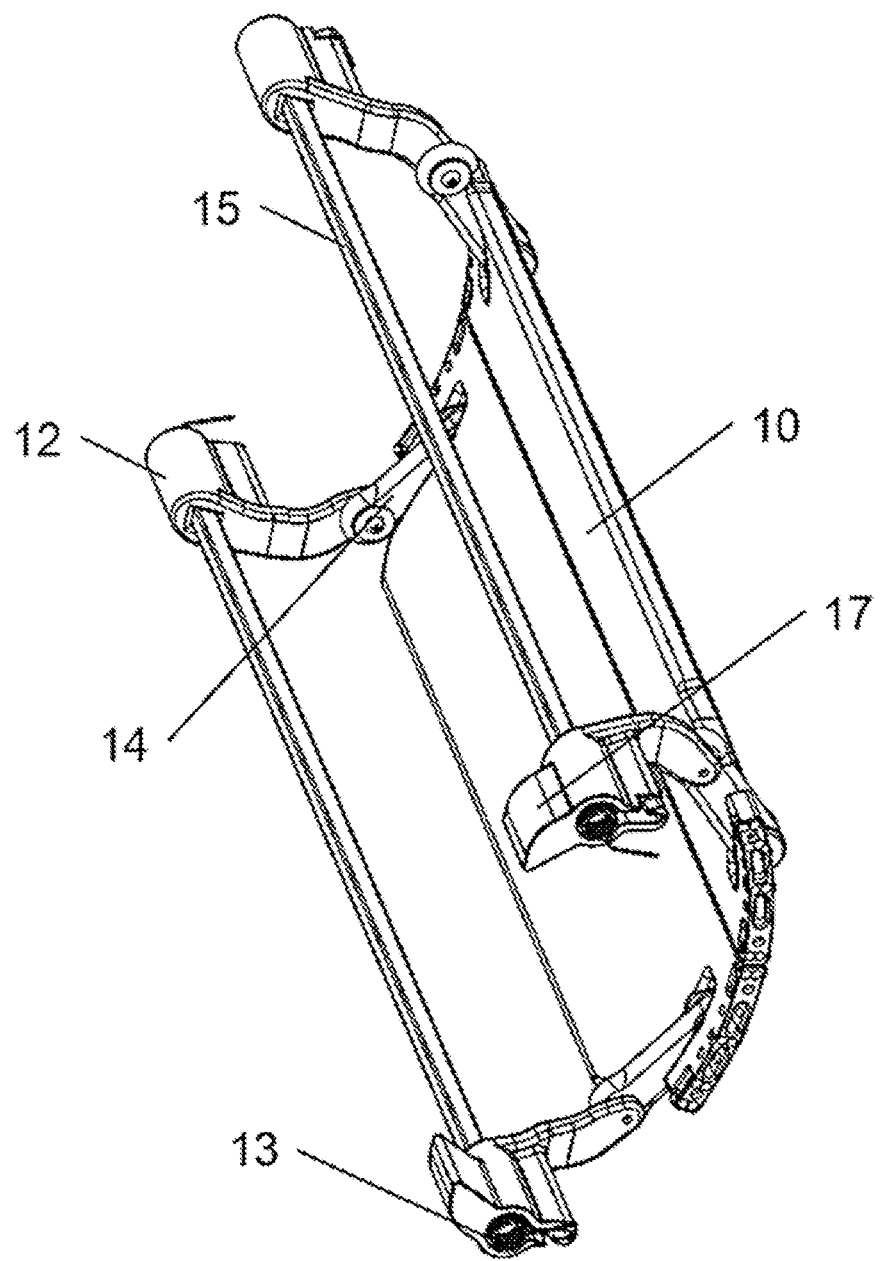
FIG. 5 is a schematic diagram of a linkage mechanism of a pedal bin according to the present disclosure.

As shown in FIG. 3 and FIG. 5, the linkage mechanism includes two positioning shells 11, four toggle rods 12, four second restoring members 13, four second connecting rods 14, two transmission rods 15, and four second limiting portions 18. The positioning shells 11 are detachably connected to the inner cavity of the garbage bag compartment 3. A slide rail 16 is arranged on a side surface of each of the positioning shells 11. An end of each of the baffle plates 10 is slidably arranged in one of the slide rails 16. A first end of each of the second connecting rods 14 is hingedly connected to one of the baffle plates 10, and a second end of each of the second connecting rods 14 is hingedly connected to one of the toggle rods 12. Each of the toggle rods 12 is rotatably arranged on a side wall of one of the positioning shells 11. A stop block 17 is arranged at a top of each of the toggle rods 12. Each of the second limiting portions 18 is arranged on the side wall of one of the positioning shells 11 and is pressed against a side surface of one of the stop blocks 17. A first end of each of the transmission rods 15 is connected to one toggle rod 12, and a second end of each of the transmission rods 15 is connected to another toggle rod 12. Each of the second restoring members 13 is connected to one of the toggle rods 12 and one of the positioning shells 11. The first connecting rod 6 is moved downward to cause the toggle blocks 7 to respectively press downward the stop blocks 17 to drive the toggle rods 12 to rotate. After the toggle blocks 7 are moved downward and separated from the stop blocks 17 respectively, the toggle rods 12 are reset by the second restoring members 13 respectively. The first connecting rod 6 is moved downward to cause the toggle blocks 7 to respectively press downward the stop blocks 17. Under the action of the first limiting portions 9, the toggle blocks 7 do not rotate, so that the stop blocks 17 respectively drive the toggle rods 12 to rotate. Under the action of the second connecting rods 14, the baffle plates 10 respectively slide along the slide rails 16 to open to allow the waste to fall into the bottom of the garbage bag. After the toggle blocks 7 are moved downward and separated from the stop blocks 17 respectively, the toggle rods 12 are reset by the second restoring members 13 respectively, so that the baffle plates 10 are closed to seal the upper portion of the garbage bag again.

For example, the second restoring members 13 may each be a torsion spring. After the toggle blocks 7 are moved downward and separated from the stop blocks 17 respectively, the toggle rods 12 are reset by torsion forces of the torsion springs respectively.

It should be noted that when the toggle blocks 7 are moved upward to respectively contact the stop blocks 17, the toggle rods 12 do not rotate under the action of the second limiting portions 18, so that the toggle blocks 7 can rotate when moving upward to respectively contact the stop blocks 17. As such, the toggle blocks 7 can be moved upward to be respectively separated from the stop blocks 17.

Figure 2:
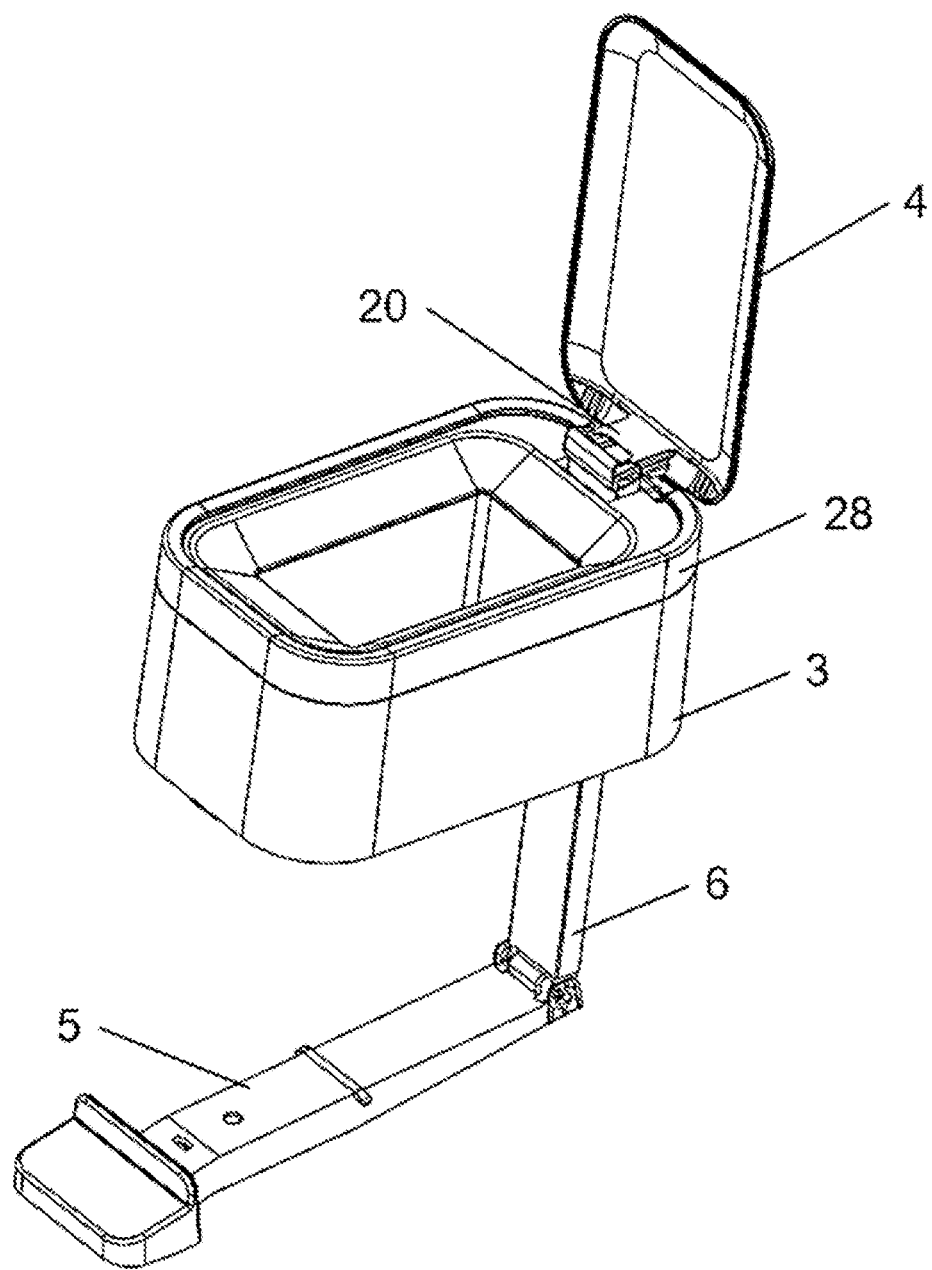
FIG. 2 is a partial schematic structural diagram of a pedal bin according to the present disclosure.
Figure 4:
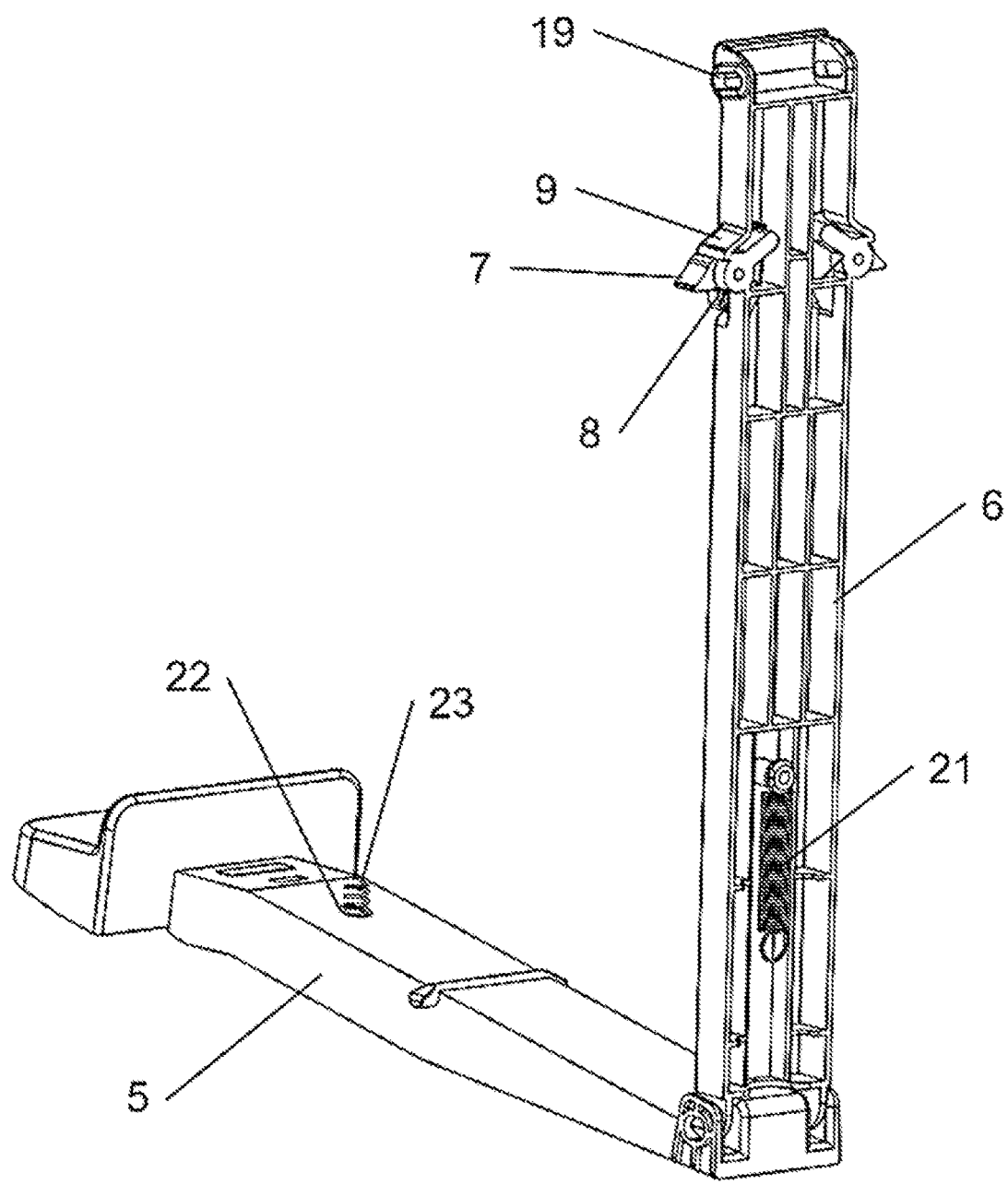
FIG. 4 is a partial schematic structural diagram of a pedal bin according to the present disclosure.

As shown in FIG. 2 and FIG. 4, two slide grooves 19 are provided at a top of the first connecting rod 6, a connection portion 20 is arranged on a bottom surface of the lid 4, and side surfaces of the connection portion 20 are respectively slidably arranged in the slide grooves 19. The first connecting rod 6 is moved upward to cause the side surfaces of the connection portion 20 to respectively slide in the slide grooves 19, so that the first connecting rod 6 pushes the lid 4 open.

As shown in FIG. 4, a third restoring member 21 is arranged on the side surface of the first connecting rod 6, and a bottom of the third restoring member 21 is connected to the base 1. The third restoring member 21 drives the first connecting rod 6 to move downward, thus resetting the first connecting rod 6.

For example, the third restoring member 21 may be a tension spring, and a tension force of the tension spring drives the first connecting rod 6 to move downward, thus resetting the first connecting rod 6.

As shown in FIG. 4, a blind hole 22 is provided on a top surface of the pedal 5, an elastic member 23 is arranged in the blind hole 22, and a top of the elastic member 23 is pressed against the bottom of the base 1. In the process of the first connecting rod 6 moving downward to reset the pedal 5, the elastic member 23 provides a buffering function to prevent the pedal 5 from being damaged due to collision with the base 1.

For example, the elastic member 23 may be a spring, an elastic force of which provides the buffering function.

Figure 6:
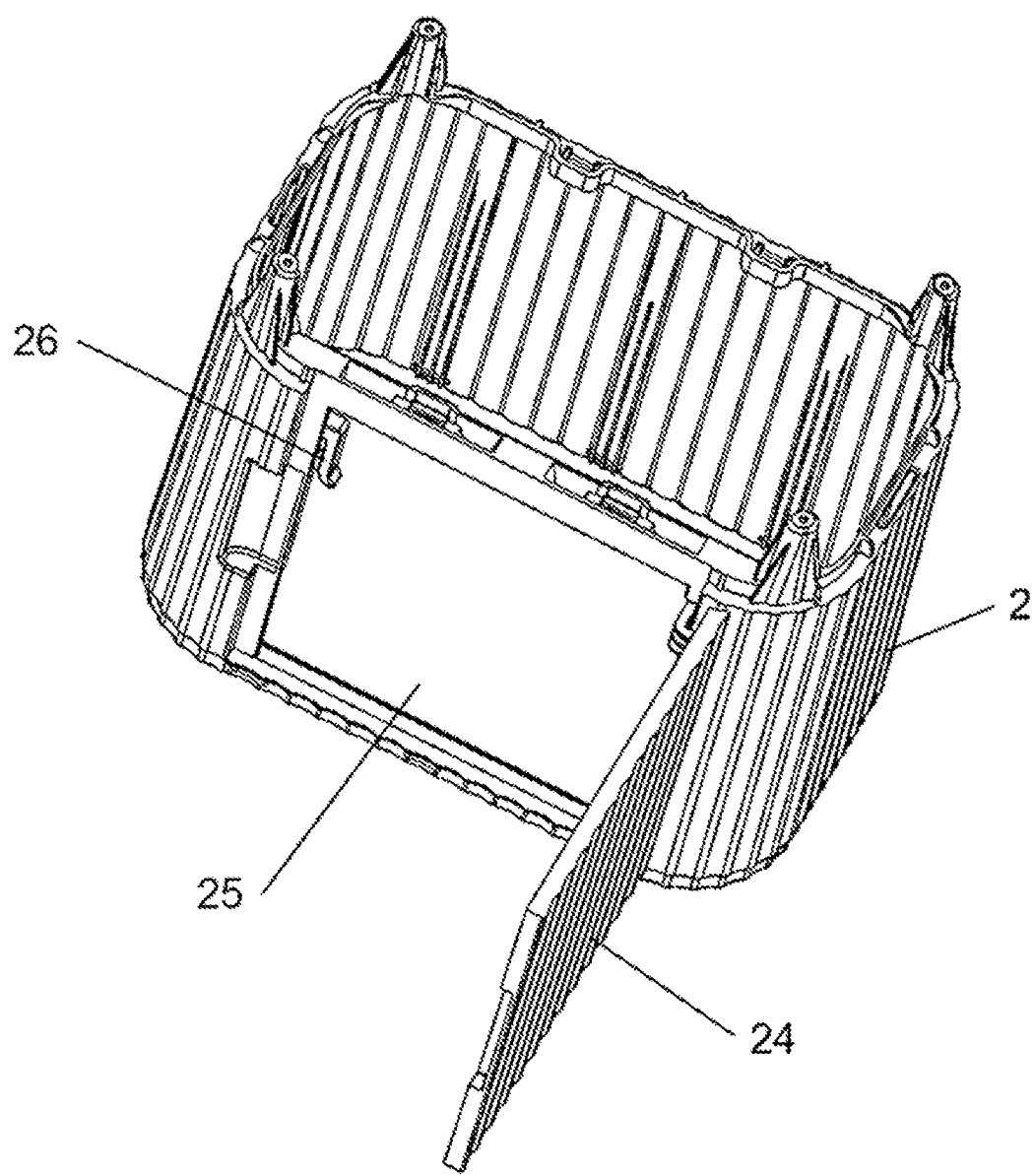
FIG. 6 is a schematic diagram of a bin body of a pedal bin according to the present disclosure.

As shown in FIG. 6, a door panel 24 and an access port 25 are provided on the bin body 2, the door panel 24 is configured to cover an opening of the access port 25, and a cutter 26 is arranged on a wall of the access port 25. The user may open the door panel 24, tie up the upper portion of the garbage bag, cut off the garbage bag with the cutter 26, and replace the garbage bag.

As shown in FIG. 1, a suction cup 27 is detachably connected to the bottom of the base 1. The pedal bin can be positioned on ground by the suction cup 27.

Embodiment 2

As shown in FIG. 1 and FIG. 2, different from Embodiment 1, a pedal bin disclosed in this embodiment further includes a clamping ring 28. The clamping ring 28 is detachably connected to the top of the garbage bag compartment 3. The lid 4 is configured to cover an opening of the clamping ring 28, to improve the tightness of closing of the lid 4.

It should be noted that the lid 4 may alternatively be hingedly connected to the clamping ring 28.

Preferred embodiments of the present disclosure have been described in detail above in conjunction with the accompanying drawings, but the present disclosure is not limited to the specific details in the above embodiments. Various equivalent modifications can be made to the technical solutions of the present disclosure without departing from the scope of the technical concept of the present disclosure. Such equivalent modifications shall all fall within the protection scope of the present disclosure.

What is claimed is:

1. A pedal bin, comprising:
a base, a bin body, a garbage bag compartment, a lid, a pedal, a first connecting rod, a toggle block, a first restoring member, a first limiting portion, a linkage mechanism, and a baffle plate, wherein
the bin body is detachably connected to a top of the base, the garbage bag compartment is detachably connected to an opening at a top of the bin body, and the lid is hingedly connected to a top of the garbage bag compartment;
the pedal is rotatably arranged at a bottom of the base, a first end of the first connecting rod is hingedly connected to the pedal, and a second end of the first connecting rod is connected to the lid;
the toggle block is rotatably arranged on a side surface of the first connecting rod, and the linkage mechanism is arranged in an inner cavity of the garbage bag compartment and forms a clutch structure with the toggle block to control opening and closing of the baffle plate;
the first limiting portion is arranged on the side surface of the first connecting rod and is pressed against a top of the toggle block; and
the first restoring member is connected to the toggle block and the first connecting rod, the pedal is configured to drive the first connecting rod to move upward to cause the toggle block to contact the linkage mechanism and rotate, and after the toggle block is moved upward and separated from the linkage mechanism, the toggle block is reset by the first restoring member.

2. The pedal bin according to claim 1, wherein the linkage mechanism comprises a positioning shell, toggle rods, a second restoring member, a second connecting rod, a transmission rod, and a second limiting portion;
the positioning shell is detachably connected to the inner cavity of the garbage bag compartment, a slide rail is arranged on a side surface of the positioning shell, and an end of the baffle plate is slidably arranged in the slide rail;
a first end of the second connecting rod is hingedly connected to the baffle plate, a second end of the second connecting rod is hingedly connected to one of the toggle rods, the toggle rods are rotatably arranged on a side wall of the positioning shell, and a stop block is arranged at a top of each of the toggle rods;
the second limiting portion is arranged on the side wall of the positioning shell and is pressed against a side surface of the stop block;
a first end of the transmission rod is connected to one of the toggle rods, and a second end of the transmission rod is connected to another of the toggle rods; and
the second restoring member is connected to one of the toggle rods and the positioning shell, the first connecting rod is moved downward to cause the toggle block to press downward the stop block to drive the toggle rods to rotate, and when the toggle block is moved downward and separated from the stop block, the toggle rods are reset by the second restoring member.

3. The pedal bin according to claim 1, wherein a slide groove is provided at a top of the first connecting rod, a connection portion is arranged on a bottom surface of the lid, and a side surface of the connection portion is slidably arranged in the slide groove.

4. The pedal bin according to claim 1, wherein a third restoring member is arranged on the side surface of the first connecting rod, and a bottom of the third restoring member is connected to the base.

5. The pedal bin according to claim 1, wherein a blind hole is provided on a top surface of the pedal, an elastic member is arranged in the blind hole, and a top of the elastic member is pressed against the bottom of the base.

6. The pedal bin according to claim 1, wherein a door panel and an access port are provided on the bin body, the door panel is configured to cover an opening of the access port, and a cutter is arranged on a wall of the access port.

7. The pedal bin according to claim 1, wherein a suction cup is detachably connected to the bottom of the base.

8. The pedal bin according to claim 1, further comprising a clamping ring, wherein the clamping ring is detachably connected to the top of the garbage bag compartment, and the lid is configured to cover an opening of the clamping ring.

* * * * *